Figure 1:
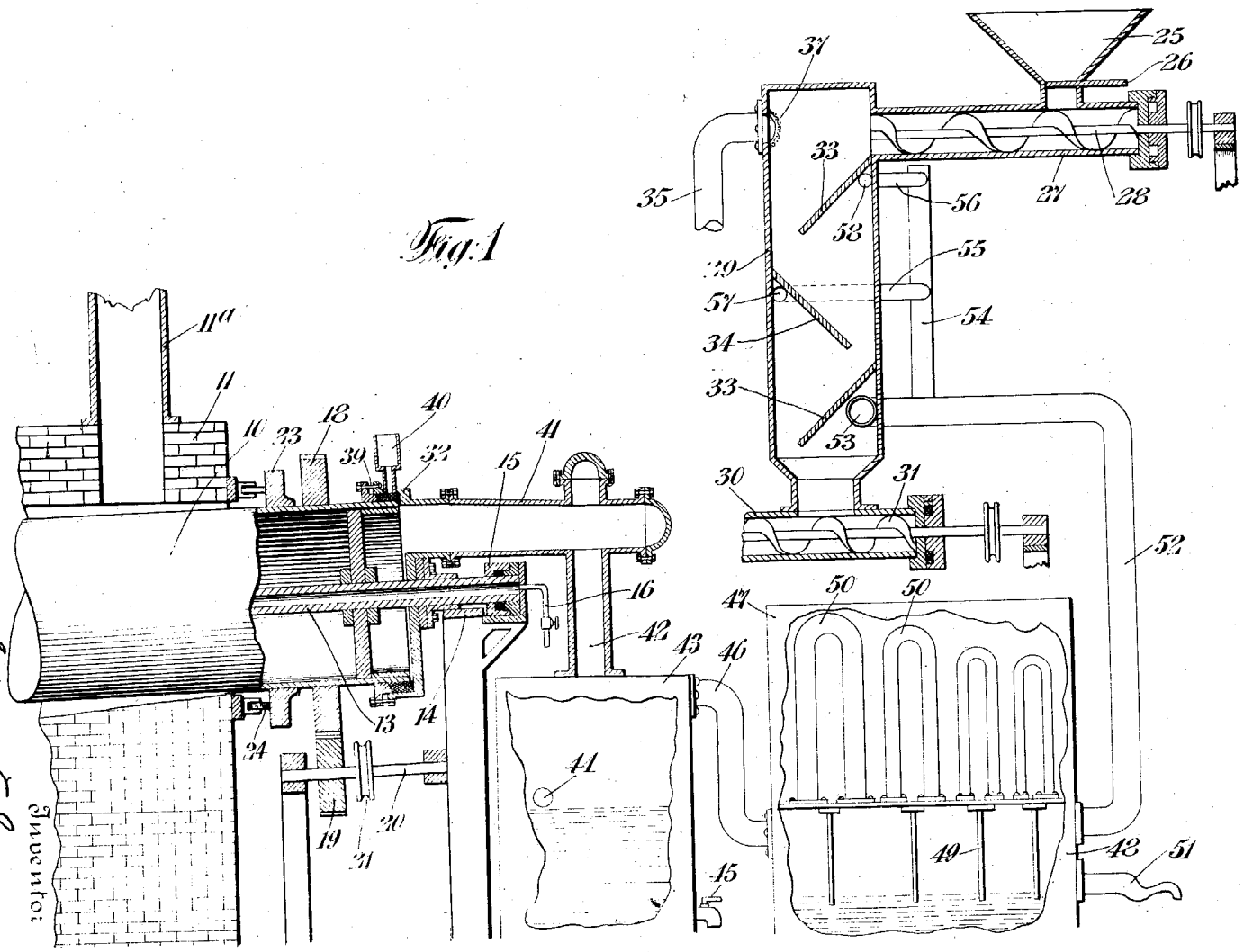

S. E. SEAMAN.

DESTRUCTIVE DISTILLATION OF WOOD AND THE LIKE.

APPLICATION FILED JULY 28, 1916.

Reissued May 8, 1917.

14,300.

3 SHEETS—SHEET 1.

Inventor

Stuart E. Seaman,

By his Attorneys

Kenyon & Kenyon

S. E. SEAMAN.
DESTRUCTIVE DISTILLATION OF WOOD AND THE LIKE.
APPLICATION FILED JULY 28, 1916.
Reissued May 8, 1917.
14,300.
3 SHEETS—SHEET 2.
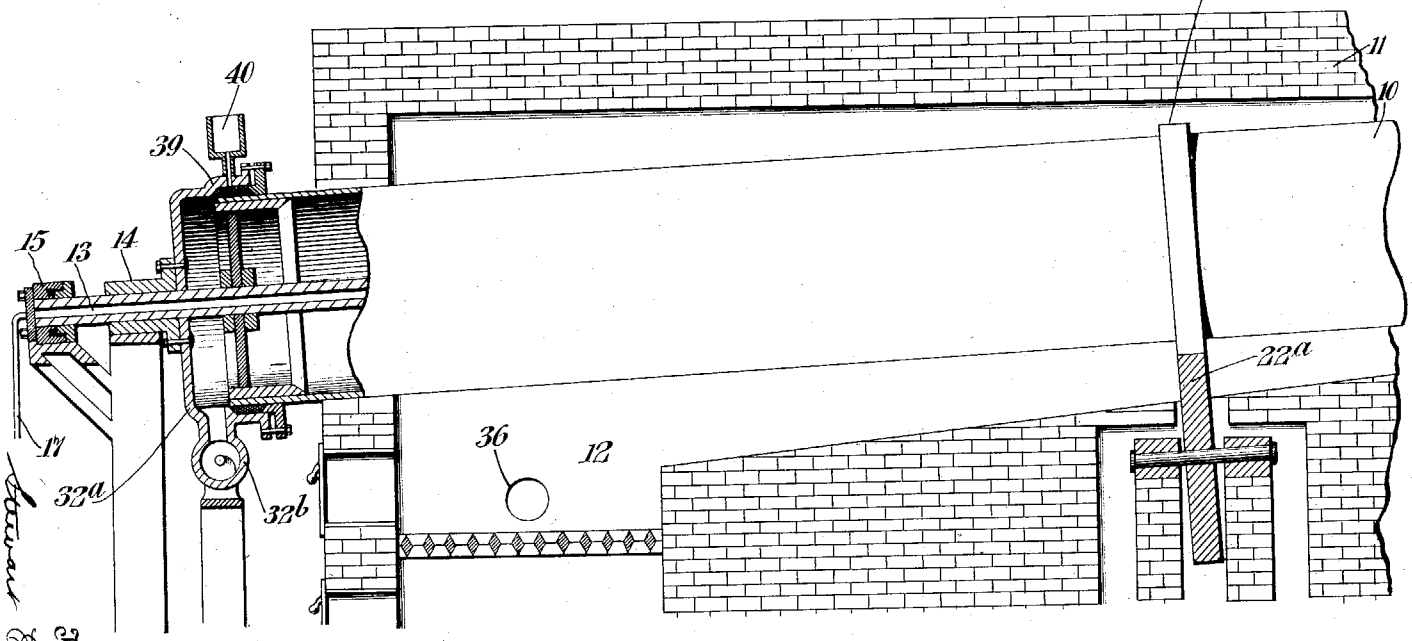
Inventor
Stewart E. Seaman
By his Attorneys
Kenyon & Kenyon S. E. SEAMAN.
DESTRUCTIVE DISTILLATION OF WOOD AND THE LIKE.
APPLICATION FILED JULY 28, 1916.
Reissued May 8, 1917.
14,300.
3 SHEETS—SHEET 3.
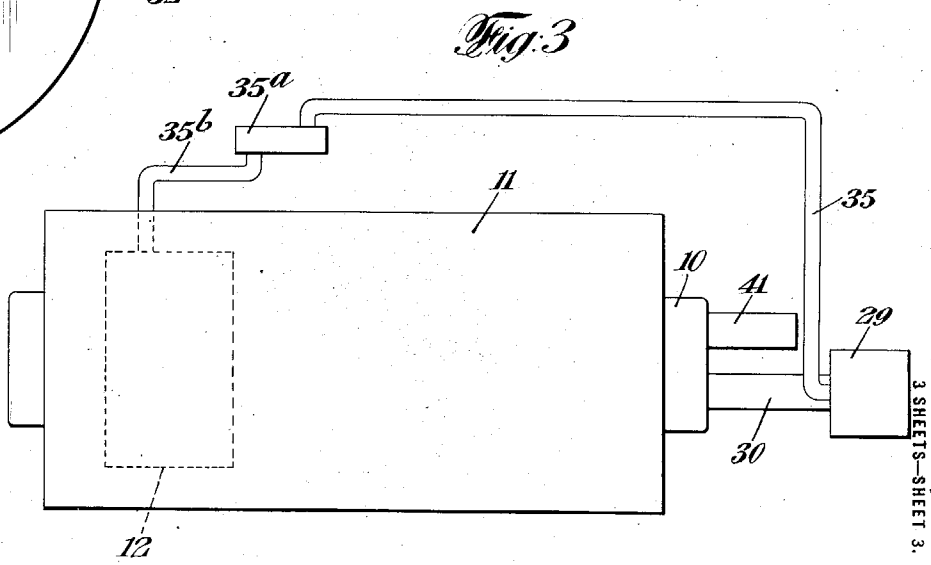
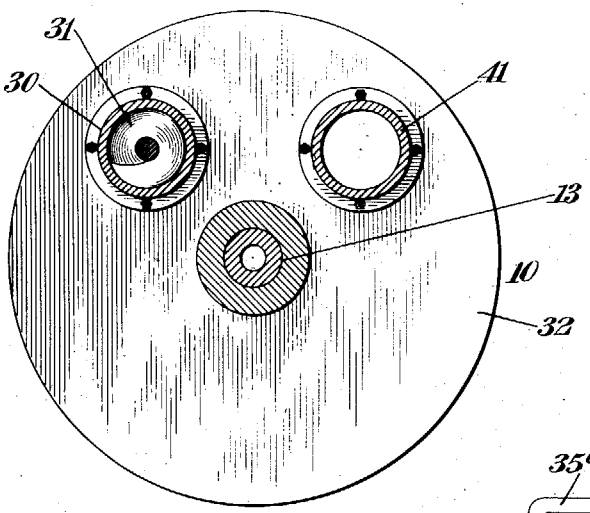
Inventor
Stewart E. Seaman,
By his Attorneys
Kenyon & Kenyon

UNITED STATES PATENT OFFICE.

STEWART E. SEAMAN, OF GAULEY MILLS, WEST VIRGINIA, ASSIGNOR TO SEAMAN WASTE WOOD CHEMICAL COMPANY, INCORPORATED, OF NEW YORK, N. Y., A CORPORATION OF NEW YORK.

DESTRUCTIVE DISTILLATION OF WOOD AND THE LIKE.

14,300. Specification of Reissued Letters Patent. Reissued May 8, 1917.

Original No. 1,108,403, dated August 25, 1914, Serial No. 809,112, filed December 27, 1913. Application for reissue filed July 28, 1916. Serial No. 111,952.

*To all whom it may concern:*

Be it known that I, STEWART E. SEAMAN, a citizen of the United States of America, and a resident of Gauley Mills, county of Webster, State of West Virginia, formerly of Brooklyn, county of Kings, State of New York, have invented a new and useful Improvement in Destructive Distillation of Wood and the like, of which the following is a full, clear, and exact description.

My invention relates to improvements in the art of destructive distillation of wood and analogous bulky and more or less solid materials capable of destructive distillation, and the object of my invention is generally to produce a method of destructive distillation which can be economically, efficiently, and rapidly carried on so that all the products capable of being saved by such destructive distillation can be advantageously saved and produced in commercial form. Heretofore difficulties have been experienced in this art because it has been practically impossible to exclude air from the retort in which the carbonization is effected, so that frequent explosions and escape of gases have occurred. This is especially true of the efforts to carry on the destructive distillation of wood in finely divided particles, as, for instance, in the form of sawdust, because so much air is carried into the retort with the material to be treated, and furthermore, as the material is a non-conductor, it is very liable to pack and prevent some of its middle portion from being treated at all. By my improvements, however, I convey the divided material from an airtight casing into a rotary inclined retort, to which heat is applied, and from which the carbonized material escapes at one end, while the gases escape from the upper end, are trapped so as to collect the tarry products, are then condensed as much as possible in the condenser and the uncondensed gases discharged into the feeding means of the apparatus so as to force out the air from the casing containing said feeding means, thus enabling the material to be delivered to the retort substantially free from air. This operation is facilitated by applying an exhaust pipe to the feed casing so as to exhaust the mixed air and gases, and economy is further subserved by delivering the mixed air and gases to the furnace of the retort, where they are used as fuel.

Reference is to be had to the acompanying drawings forming a part of this specification, in which similar reference characters indicate corresponding parts in all the views.

Figure 1 is a broken vertical longitudinal section of a portion of the apparatus, parts being shown in elevation, Fig. 2 is a similar view of the other end portion of the apparatus, Fig. 3 is a diagrammatic plan of a portion of the apparatus, and Fig. 4 is an end view of the retort showing the parts connected therewith in section.

In carrying out my improved method I use a rotary retort 10 which for convenience is preferably cylindrical, and which is inclined to the horizon, this retort being made to rotate in a suitable casing 11 of masonry or other suitable material, the casing having a stack 11[a] for the escape of smoke, etc., and a furnace 12 for heating the retort. The retort is mounted on a hollow shaft 13 which turns in suitable bearings 14 at the ends of the retort, and the shaft has glands 15 at the ends, and a pipe 16 as an inlet pipe at the upper end, and the pipe 17 an outlet pipe at the lower end. This arrangement enables a cooling medium to be passed through the shaft so as to prevent it from being distorted by heat. I am not going into the details of the construction of the retort, but have shown and shall describe enough of the apparatus to show how my improved method can be carried into effect.

The retort is rotated in any suitable manner, and preferably by securing to it a gear wheel 18 which meshes with the gear wheel 19 on the shaft 20, this being driven by a pulley 21 or equivalent driving means. The retort can also be stayed as shown in Fig. 2 by providing it with a wheel 22 running on an idler 22[a] which is suitably supported. To prevent the retort from moving longitudinally by reason of its inclination, it is provided with a collar 23 which turns against suitable thrust bearings 24 preferably of the roller bearing type. The material, such as sawdust or finely divided wood or analogous material, is supplied to the retort by feeding it into the hopper 25 which is controlled by a suitable gate 26, and from thence the material drops into the horizontal casing 27 which is airtight except at its entrance and discharge orifices, and through which extends a suitable conveyer 28, this delivering into a vertical portion 29 of the feeding casing, and the latter discharges into the horizontal casing 30 in which is a suitable conveyer 31. This conveyer discharges through the stationary head 32 at the upper end of the retort 10. I have not shown the connection between the parts 30 and 32, but it will be understood that the conveyer 31 simply discharges through an opening in the head 32.

In the vertical portion 29 of the feed casing are inclined ledges 33 and 34 which are oppositely disposed as the drawing shows, so that the material entering from the conveyer 28 will be broken up to permit the air to be eliminated from it. To facilitate this arrangement an exhaust pipe 35 is connected with the upper part of the casing 29, and is made to discharge through a fan $35^a$ and pipe $35^b$ through the opening 36 into the furnace 12, where a suitable burner can be provided to burn the gases passed through the pipe 35. The inlet end of the pipe 35 should be protected in some manner by a screen 37 or the like, to prevent the material to be treated from entering the pipe.

The stationary head 32 at the upper end of the retort 10 connects with the retort by means of an expansion joint 39 which permits the retort to expand without interfering with the head, and a suitable oil cup 40 is also provided for this joint. A similar arrangement is also provided at the lower end of the retort 10, and the stationary lower head $32^a$ discharges the carbonized material by means of a suitable conveyer $32^b$ into suitable receptacles which can be prepared to receive it.

Opening from the head 32 of the retort is a pipe 41 which by means of the pipe 42 connects with the settling tank or trap 43, this having a suitable overflow pipe 44 and a draw-off pipe 45. The tank 43 connects by means of the pipe 46 with a condenser 47, the condenser having a lower compartment 48 to which the pipe 46 connects, and it will be noticed that the pipe 46 leads from the upper part of the tank or trap 43. The compartment 48 is provided with vertically arranged baffles 49 which come between the legs of the vertically arranged inverted U-shaped members 50 which are inclosed by a cooling medium in the condenser 47 so that the gases pass through first one of these members 50 and then another until such of them as are condensable are condensed and discharged in liquid form into the compartment 48 from which they are withdrawn through the pipe 51. The uncondensed gases discharge into the pipe 52 which connects with the condenser 48, and this pipe delivers, as shown at 53, to a point beneath the lower ledge 33, and by means of branch pipes 54, 55 and 56 beneath the ledges 33 and 34 as shown at 58 and 57 in Fig. 1.

When the operation is started, the feed of material will discharge the said stock to be treated into the retort 10, where it is rotated, and this causes the finely divided material to be broken up, especially as the retort should be provided with blades or agitators for this purpose. As the material is heated, the gases are driven from it through the pipes 41 and 42, while the solid parts of the material pass gradually by gravity to the lower end of the retort. When these solid parts of the material reach the lower ends of the retort they are carbonized and pass out through the carrier or conveyer $32^b$. The heavier parts of the gases are condensed in the form of tar in the trap or settling tank 43, while the other gases pass to the condenser 47. This arrangement has the advantage of separating the tar before it reaches the condenser, and this prevents fouling the condenser. The distillate is drawn off from the compartment 48, and the cool uncondensed gases enter the feed casing 29 at points beneath the ledges 33—34. The gases back up beneath the ledges and pass up through the material which is being fed through the casing, thus driving out the air from the material, and the mixed air and gases of combustion are drawn out through the pipe 35 and delivered beneath the retort where they serve as fuel.

It will thus be seen that the method which I have described is a continuous method, that the carbonized material and the gaseous products of the stock are constantly and thoroughly separated, that the tar is extracted from the gaseous product, that the distillate is collected free of tar, and that the cool uncondensed gases serve as a medium for eliminating the excess of air from the material to be treated and for providing fuel to carry on the distillation. The uncondensed gases and air provide nearly enough fuel to keep the retort and the process in operation. It will be observed that in carrying on this continuous process, excess of air is absolutely eliminated from the charge, and escape of gases is thereby rendered unlikely, while this escape is further provided against by the glands 39 at the ends of the retort. It will also be noticed that the exhauster working on the pipe 35 will draw back to the retort so that atmospheric pressure may be easily maintained in the retort, or less than this if desired.

Attention is called to the fact that the uncondensed gases, after they have passed through the trap and condenser, will be cool, so that when forced upward through the casing 29 they will expel the atmospheric air, but without endangering the product by combustion. If the gases were injected hot into the incoming material, which is more or less saturated with oxygen, one of two things would take place, either instant combustion, or an explosion; but the cool gases obviate this difficulty, and they more thoroughly expel the oxygen because the incoming fuel is agitated and broken up by the baffles 33 and 34, and the action is assisted by the exhaust through the pipe 35.

I claim:—

1. The herein described improvement in the art of destructive distillation of wood and the like, which consists in treating the charge in a sealed retort from which air is excluded, and eliminating the air from the charge before it reaches the retort by forcing the cool uncondensed gases generated in the retort through the charge before it enters the retort.

2. The herein described improvement in the art of the destructive distillation of wood and the like, which consists in heating the charge in a suitable retort, drawing off the gaseous products of the charge from the retort, condensing said gaseous products, forcing the cool uncondensed gases of the condenser through the charge before the latter enters the retort, thereby expelling the air from the charge and delivering the mixed gas and air so obtained as a fuel beneath the retort.

3. The herein described improvement in the art of the destructive distillation of wood and the like, which consists in feeding a charge through an air tight casing into a suitable retort, condensing the gaseous products of the retort, discharging the cool uncondensed gases from the condenser into the aforesaid air tight casing, and withdrawing the air and gases from said casing and discharging them as fuel beneath the retort.

4. The improvement in the art of the destructive distillation of wood and the like, which consists in feeding a charge to a retort through an essentially air tight casing, drawing off the gaseous products of the charge from said retort, then trapping said gaseous products to collect the tar, then condensing said gaseous products, next drawing the cool uncondensed gases through the aforesaid feed casing thereby forcing the air from the charge, and finally delivering the mingled air and gas collected from said casing to a point below the retort as a fuel.

5. The herein described improvement in the art of the destructive distillation of wood and the like, which consists in feeding the finely divided charge to the retort from an essentially air tight casing, condensing the gaseous products of the retort, and forcing the cool uncondensed gases through the aforesaid air tight casing, thereby driving out the excess of air from the charge.

6. The improvement in the art of continuous destructive distillation of wood and the like, which consists in continuously subjecting the material to be distilled to destructive distillation in a suitable retort, feeding such material to the retort, and expelling air from the said material as it is being fed and before it reaches the retort, so that the said material is delivered to the retort substantially free from air.

7. The improvement in the art of continuous destructive distillation of finely divided wood and the like, which consists in continuously subjecting the said material to destructive distillation in a suitable retort, feeding such material to the retort, and expelling air from the said material as it is being fed and before it reaches the retort, so that the said material is delivered to the retort substantially free from air.

8. The improvement in the art of continuous destructive distillation of wood and the like, which consists in feeding to a suitable retort the material to be subjected to destructive distillation, expelling air from such material while it is being so fed, continuously treating the material to destructive distillation in the retort, withdrawing the gaseous products therefrom, cooling the said gases and condensing therefrom the condensable constituents thereof, and passing the cool uncondensed gases through the material as it is being fed and before it enters the retort, to expel air therefrom.

9. The improvement in the art of continuous destructive distillation of wood and the like, which consists in feeding to a suitable retort the material to be subjected to destructive distillation, expelling air from such material while it is being so fed, continuously treating the material to destructive distillation in the retort, withdrawing the gaseous products therefrom, cooling the said gases, and passing them through the material as it is being fed and before it enters the retort, to expel air therefrom.

In testimony whereof, I have hereunto subscribed my name to this specification.

STEWART E. SEAMAN.